May 13, 1969     T. E. SPENCE     3,443,443
TRANSMISSION MECHANISM
Filed Jan. 30, 1967     Sheet 1 of 3
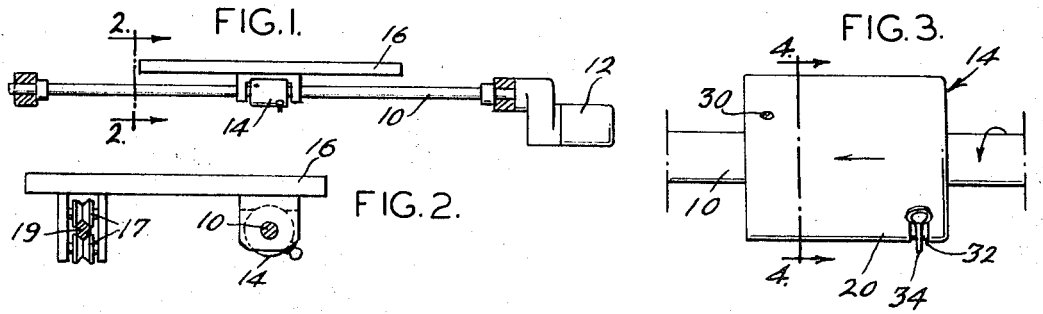
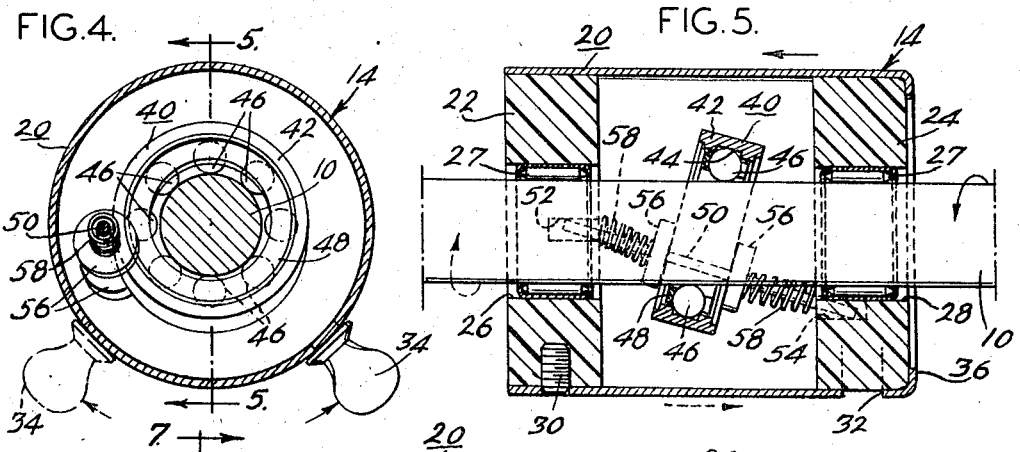
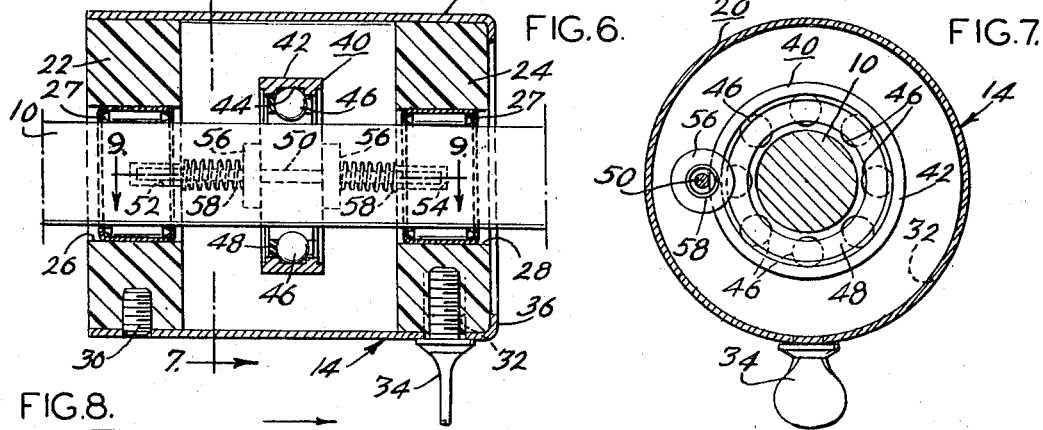
INVENTOR:
THOMAS E. SPENCE
BY Howson & Howson
ATTYS.

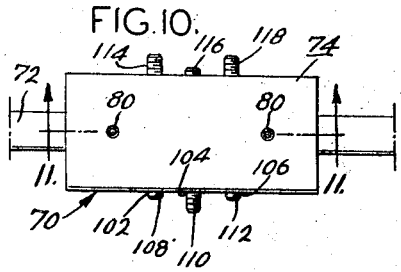
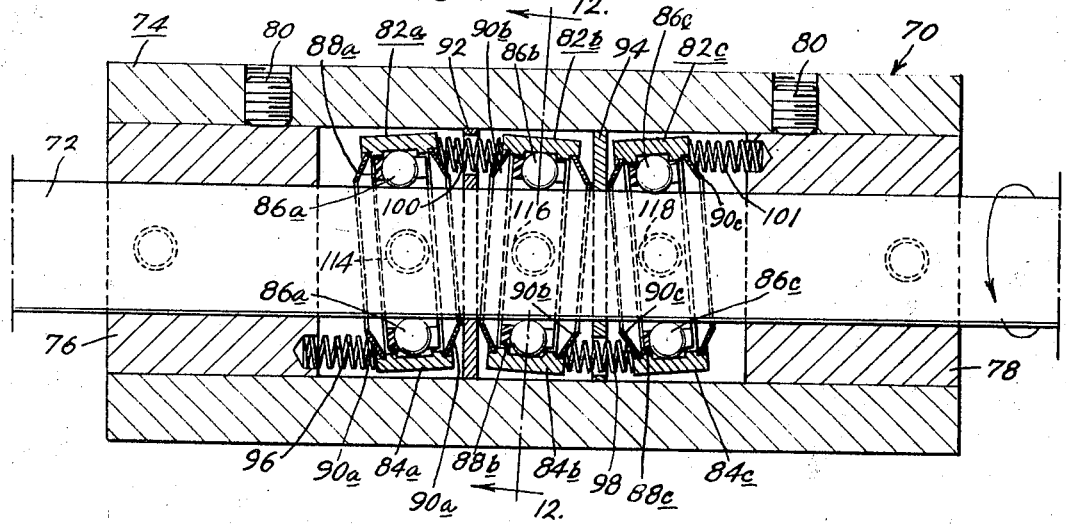
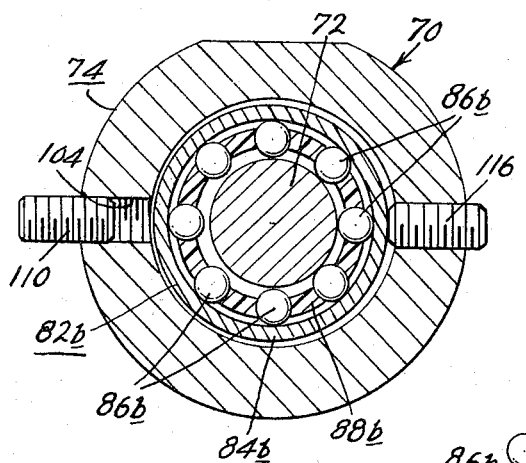
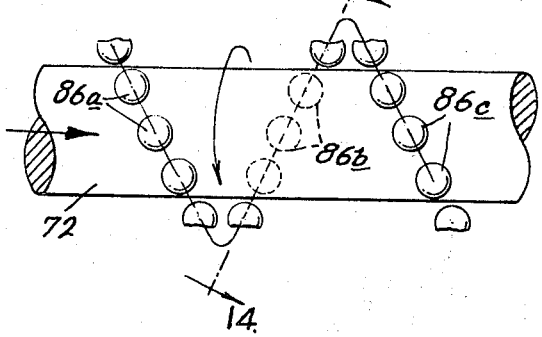
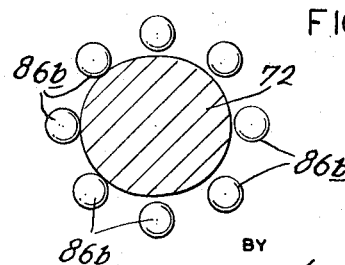

May 13, 1969

T. E. SPENCE 3,443,443

TRANSMISSION MECHANISM

Filed Jan. 30, 1967

INVENTOR:
THOMAS E. SPENCE
BY Howson & Howson
ATTYS.

United States Patent Office 3,443,443
Patented May 13, 1969

3,443,443
TRANSMISSION MECHANISM
Thomas E. Spence, Radnor, Pa., assignor to SKF Industries, Inc., King of Prussia, Pa., a corporation of Delaware
Filed Jan. 30, 1967, Ser. No. 612,443
Int. Cl. F16h 21/16
U.S. Cl. 74—25                        9 Claims

ABSTRACT OF THE DISCLOSURE

A transmission mechanism for converting rotary motion of a shaft to linear motion of a member mounted on the shaft, the member mounted on the shaft including at least one control bearing assembly having a plurality of balls in direct contact with the shaft and in operation are free to rotate on whatever axis develops as a result of the shaft and ball contact. There is a diametral clearance between the complement of balls and shaft outer surface so that the angular position of the bearing and shaft may be selectively varied to vary the direction and rate of linear movement of the member mounted on the shaft.

---

The present invention relates to an improved type of motion transmission mechanism and particularly to a transmission mechanism incorporating anti-friction bearings.

More specifically the mechanism of the present invention is intended for use in applications where it is desired to convert rotary motion to a linear motion. The mechanism of the present invention in its broadest aspect includes a rotatable shaft and a housing mounted on the shaft having at least one ball bearing assembly mounted therein wherein the balls directly confront and engage the shaft and are mounted to provide a diametral clearance between the shaft so that they may be positioned at an angle to the center line or axis of rotation of the shaft.

In some prior devices of the above type, the roller component is constrained to rotate about an axis established for that purpose. Thus, in these prior assemblies the bearing component in contact with the shaft has a surface conforming generally to the contour of the shaft and in these arrangements the component contacting the shaft develops a frictional contact surface area in which the elements rotate about a predetermined axis disposed at an angle to the shaft centerline. The elements in the corresponding shaft contact area rotate about the shaft centerline axis and an inevitable slippage between the two surfaces occurs. This, of course, results in galling, smearing, and other surface distresses which limit the life of the entire assembly.

By contrast, in accordance with an important characteristic of the mechanism of the present invention, the roller components, balls, are in direct contact with the shaft and are not confined to an applied axis; rather, they are free to rotate on whatever axis develops as a result of the shaft and raceway contacts on the sphere. Thus, the shaft contact will influence toward true rolling of the balls with less slippage within the shaft contact area as compared with fixing the rotational axis of the rolling elements. Thus, by reducing sliding, the life of the entire assembly is increased considerably.

With the foregoing in mind, an object of the present invention is to provide a transmission mechanism for converting rotary motion to linear motion characterized by novel features of construction and arrangement wherein slippage of the rolling elements is minimized and hence, the life of the entire assembly is extended considerably.

Another object of the present invention is to provide a transmission mechanism for converting rotary to linear motion wherein the amount of thrust and the rate of linear motion may be varied selectively.

A further object of the present invention is to provide a mechanism of the above type for translating rotary to linear motion incorporating built-in slip means to prevent overload damage to the mechanism under certain operating conditions.

A still further object of the present invention is to provide a transmission mechanism which is comprised of relatively few parts, is easy and economical to manufacture and is fully effective for the purposes intended.

These and other objects of the present invention and the various features and details of the operation and construction thereof, are hereinafter more fully set forth with reference to the accompanying drawings, wherein:

FIG. 1 is a schematic illustration of a device embodying the transmission mechanism of the present invention;

FIG. 2 is a view taken on lines 2—2 of FIG. 1;

FIG. 3 is an enlarged side elevational view of the transmission mechanism of the present invention;

FIG. 4 is an enlarged sectional view taken on lines 4—4 of FIG. 3;

FIG. 5 is an enlarged sectional view taken on lines 5—5 of FIG. 4;

FIG. 6 is a sectional view similar to FIG. 5 with the bearing assembly in a neutral or center position;

FIG. 7 is an enlarged sectional view taken on lines 7—7 of FIG. 6;

FIG. 8 is a sectional view similar to FIG. 5 showing the angular relationship of the bearing assembly reversed whereby translation of the housing is in the opposite direction for the same rotary direction of the shaft;

FIG. 9 is an enlarged fragmentary sectional view taken on lines 9—9 of FIG. 6;

FIG. 10 is a side elevational view of a second embodiment of transmission mechanism in accordance with the present invention;

FIG. 11 is a sectional view taken on lines 11—11 of FIG. 10;

FIG. 12 is an enlarged sectional view through the mechanism taken on lines 12—12 of FIG. 11;

FIG. 13 is a schematic illustration of the bearing contact with the shaft showing the helix formation;

FIG. 14 is a view taken in lines 14—14 of FIG. 13;

Figure 15:
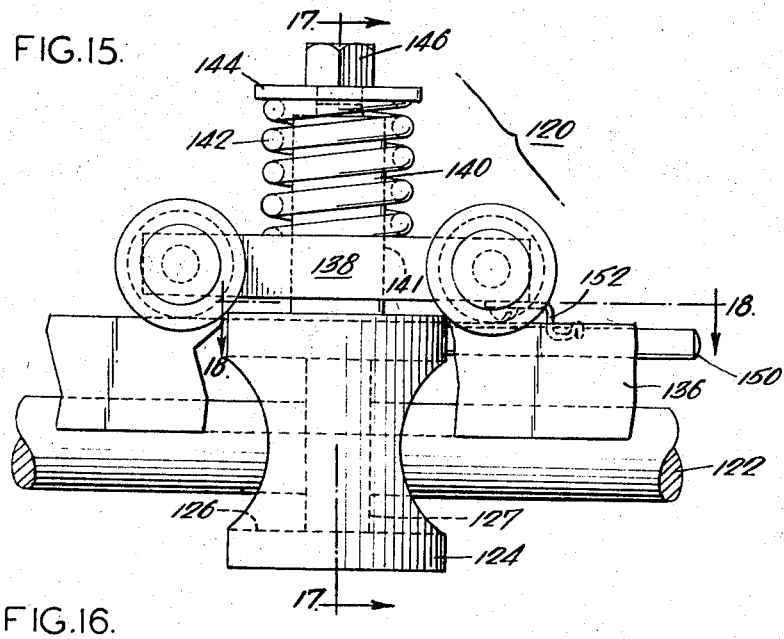
FIG. 15 is a side elevational view of still another embodiment of the transmission mechanism in accordance with the present invention.
Figure 16:
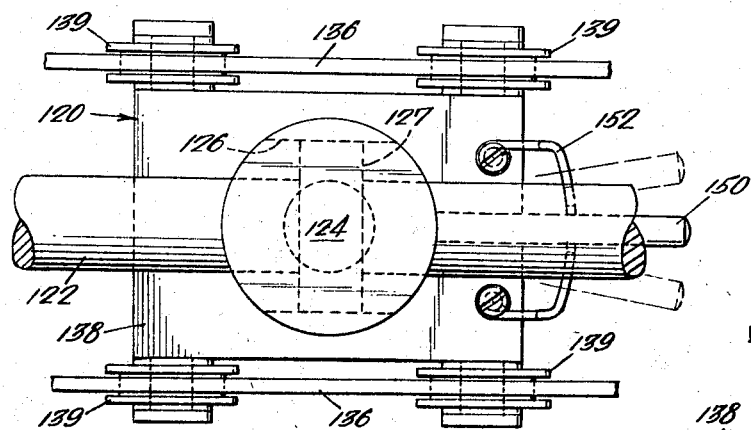
FIG. 16 is a plan view of the transmission mechanism shown in FIG. 15.
Figure 18:
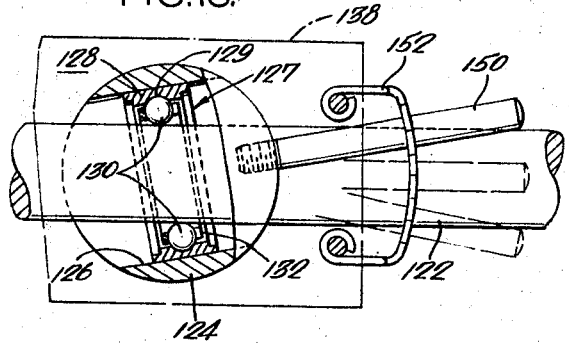
FIG. 18 is a view taken on lines 18—18 of FIG. 15 showing the adjustment means for the control bearing assembly.

Referring now to the drawings and particularly to FIGS. 1 and 2 thereof, there is illustrated schematically a system incorporating a transmission mechanism in accordance with the present invention wherein rotary motion is translated into linear motion. In the system illustrated a transmission mechanism 14 in accordance with the present invention is mounted on a shaft 10 rotated by a suitable actuator means such as a motor 12. In the present instance the transmission mechanism carries a table 16 or the like whereby upon rotary motion of the shaft 10 through the motor 12, the table is moved in one direction, for example to the left with respect to FIG. 1, and by adjusting the transmission mechanism 14, the table may be moved to the right upon rotation of the shaft in the same angular direction. The table mounts guide rollers 17 which ride on a guide rod 19 to stabilize the table during movement relative to the shaft.

The transmission mechanism as best illustrated in FIGS. 4 and 5 includes a generally cylindrical tubular housing 20 and a pair of spaced apart annular rings or collars 22 and 24 forming end closures at axial ends of the housing. Central openings 26 and 28 of the collars 22 and 24 are of larger diameter than the shaft 10 to accommodate in the present instance, needle type roller bearing assemblies 27 for rotatably supporting the transmission mechanism on the shaft 10. The collar 22 is rigidly supported in the housing by means of a set screw 30 and the collar 24 is adapted for limited angular movement relative to the housing and to this end the housing 20 is provided with an arcuate slot 32 to receive a locking screw 34 engageable in a threaded opening in the collar 24. The housing 20 has an inturned radial lip 36 to retain the collar 24 interiorly of the housing.

The transmission mechanism further includes a control bearing assembly 40 circumscribing the shaft 10 which is disposed interiorly of the housing 20 between the collars 22 and 24 and is adapted for pivotal movement relative to the shaft for selectively controlling linear movement of the transmission mechanism upon rotation of the shaft. The bearing assembly 40 comprises an outer ring 42 having a raceway 44, a plurality of rolling elements in the present instance, balls 46 guided and supported in the outer ring by means of a cage 48.

The angle of the bearing assembly 40 relative to the axis of the shaft determines the rate of movement of the transmission mechanism axially of the shaft and the amount of thrust delivered. Thus in operation the rolling elements of the bearing assembly 40 define a helix on the shaft much in the nature of a pitch or lead of a conventional screw thread. In other words, as the shaft 10 rotates, the balls 46 describe a helical path along the shaft 10 and move the housing forward or backward depending on the direction of rotation of the shaft or the angle at which the bearing assembly is inclined relative to the shaft. It is noted that in the present instance the balls 46 are in direct contact with the shaft 10 so that they are not confined to an applied axis, but are free to rotate on whatever axis develops as a result of the shaft and raceway contacts on the balls. By this arrangement, the shaft contact will coerce the balls toward true rolling with less slippage within the shaft contact area than if the balls were held on a fixed axis against any adjustment toward true rolling. In this manner, galling, smearing, and other surface distresses which limit the life of the assembly are minimized and the life of the unit extended considerably.

In the present instance, resilient, elastically yieldable mounting means is provided for selectively adjusting the angular position of the control bearing assembly 40 relative to the shaft 10. This mounting means, as illustrated, comprises an elongated rod 50 which straddles the outer ring 42 of the bearing assembly 40 having its outer terminal ends engaged in slotted socket-like openings 52 and 54 in the collars 22 and 24 respectively. The yieldable mounting means further includes a pair of discs 56 on either side of the outer ring and compression springs 58 circumscribing the rod between the disc and the inner wall of the collars. By this arrangement, the bearing assembly 40 may be disposed at a selected angular position relative to the shaft 10 simply by loosening the locking screw 34 and rotating the collar 24 and thereafter tightening the screw 34. It is noted that for a given angular rotation of the shaft 10, the rate of linear movement or rate of axial movement of the transmission mechanism relative to the shaft 10 may be selectively varied by adjusting the angular position of the control bearing assembly in a position intermediate its opposite limit position in the manner discussed above.

Considering now briefly the operation of the transmission mechanism and particularly with respect to FIG. 5, assuming the shaft 10 is rotating in the direction indicated by the arrow and the bearing assembly 40 is disposed angularly relative to the shaft in the direction indicated, the housing 20 is translated or moved in a direction to the left. (See FIG. 3.) It is noted that the housing may be caused to move in the opposite direction simply by reversing the position of the control bearing assembly 40 to the position shown in FIG. 8. Further, by reason of the direct contact of the balls 46 on the shaft, the rollers rotate about an axis which develops as a result of the shaft and raceway contact on the balls and hence, galling, smearing and other surface distresses are minimized. Additionally, by providing a resilient mounting means there is less tendency of the unit to jam or lock during operation.

There is shown in FIG. 10 another embodiment of transmission mechanism in accordance with the present invention generally designated by the numeral 70. This device is also adapted for mounting on a shaft 72 and upon rotation of the shaft, is designed to effect linear motion of a member such as a table or the like carried by the transmission mechanism.

The transmission mechanism 70 as best shown in FIG. 11, comprises an elongated, generally cylindrical tubular housing 74 having a pair of outer collars 76 and 78 journalled on the shaft 70 and secured to the housing by means of set screws 80 to form end closures. In the present instance, a plurality of control bearing assemblies are mounted interiorly of the housing 74 between the end rings and in the embodiment illustrated there are three such assemblies, $82_a$, $82_b$, and $82_c$. Each of the control bearing assemblies is identical in construction and accordingly the parts thereof have the same reference numeral with a different subscript letter. Thus, the control bearing assembly $82_a$ comprises an outer ring $84_a$, a plurality of rolling elements, balls, $86_a$, a cage $88_a$ having pockets circumferentially spacing the balls and retaining them inside of the outer ring and a pair of frusto-conical end shields $90_a$ at opposite axial ends of the outer ring $84_a$. Spacer rings 92 and 94 circumscribing shaft 70 are positioned between adjacent control bearing assemblies, as illustrated in FIG. 11. Further as illustrated, the control bearing assemblies $82_a$, $82_b$ and $82_c$ are biased to the angularly disposed relative positions shown in FIG. 11 by means of a series of compression springs arranged in diametrically opposed pairs, the spring 96 of one pair engaging between a collar 76 and bearing assembly $82_a$ and the other spring 98 of the first pair being disposed between the bearing assemblies $82_b$ and $82_c$. One spring 100 of the other pair is disposed between the bearing assemblies $82_a$ and $82_b$ and the other spring 101 of the other pair is disposed between the collar 78 and the bearing $82_c$. The spacer rings are provided with suitable openings through which the compression springs 98 and 100 engage.

In accordance with this embodiment of the invention, means is provided for effecting linear motion of the transmission mechanism for a given angular rotation of the shaft 70 in a predetermined direction. More specifically this is accomplished by displacing the bearing assemblies in a predetermined manner to vary the relative contact zones between the balls and the shaft of the bearing assemblies. To this end the housing is provided with a series of three axially spaced openings 102, 104 and 106 to receive set screws 108, 110 and 112 which are adapted to engage the bearing assemblies $82_a$, $82_b$ and $82_c$ at a point approximately 90° displaced or removed from the plane of the spring biasing means. A second row of axially spaced openings diametrically opposed from the first row is provided for set screws 114, 116 and 118. By this arrangement for rotation of the shaft 70 in the direction indicated by the arrow in FIGS. 11 and 13, the linear displacement of the transmission mechanism to the left with respect to FIG. 11, the set screws 102 and 106 are threaded inwardly to displaced the bearing assembiles to the left with respect to FIG. 12, the set screws 114 and 118 being backed off and the set screw 116 is threaded inwardly to displace the center bearing assembly $82_b$ to the right with respect to FIG. 12. For the same angular rotation of the shaft 70, the linear motion of the transmission mechanism may be reversed simply by backing off the set screws 102, 106 and 116 and turning in the set screws 104, 114 and 118. This in effect reverses the helical path of the balls on the shaft and effects a reverse movement of the transmission mechanism. It is noted that the amount of thrust delivered may be varied by selectively regulating the pressure-applying relation of the bearing assembly on the shaft through the set screws and that the rate of linear movement may be changed by varying the pressure-applying relation between the assemblies, that is, by moving the end collars 76 and 78 inwardly toward one another or outwardly.

There is shown in FIGS. 15–18 inclusive a third embodiment of transmission mechanism in accordance with the present invention generally designated by the numeral 120. This device is also adapted for converting rotary motion of a shaft to a linear motion of a member mounted on the shaft or vice versa.

Figure 17:
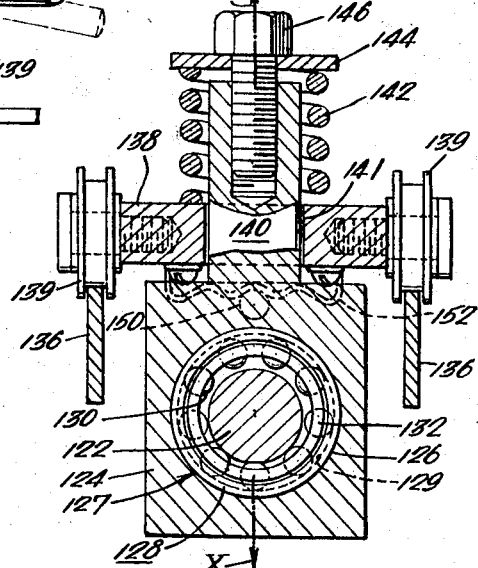
FIG. 17 is a sectional view taken on lines 17—17 of FIG. 15.

The transmission mechanism 120 includes a housing 124 having a circular bore 126 extending therethrough within which is mounted a control bearing 127 having an internally grooved bearing ring 128. The ring 128 supports a plurality of rolling elements, in the present instance, balls 130 spaced either by a retainer 132 or filled with a full complement in the same manner as an antifriction bearing. An internal groove 129 in the ring 128 positions the rolling elements on the inside tangent circle, the diameter of which is greater than the diameter of the shaft 122 as illustrated in FIG. 17.

In the present instance the transmission mechanism 120 is adapted for movement along a pair of spaced apart rail members 136 and to this end the transmission mechanism includes a carriage or carrier plate 138 which mounts at its corners, rollers 139 which ride on the stationary rails 136. The transmission mechanism further includes a post member 140 formed integrally with the housing 124 and projecting through a circular opening 141 in the carrier plate 138. A compression spring 142 circumscribes the post 140 having one end engaging the carrier 138, the spring adapted to be biased and preloaded by means of a disc 144 engaging the opposite end of the compression spring 142 and a bolt 146 threadedly engaged in the upper end of the post 140 to permit selective loading of the spring 142. By this arrangement the force system establishes an internal equilibrium between the rails 136 and shaft 122 whereby the multiple rolling elemetns estabilsh a zone of forces acting on the shaft. It is noted the rails 136 which are mounted by suitable means in a stationary position relative to the shaft 122 position the transmission mechanism so that a plane X—X (see FIG. 17) passes through the axis of the shaft 122, the center of the control bearing 127 and center of the post 140.

The housing 124 is adapted for limited rotary movement relative to the carrier plate 138 about an axis generally perpendicular to the shaft axis and passing through the above-mentioned zone of forces so that the angular relationship of the control bearing 127 realtive to the axis of the shaft 122 may be selectively varied and accordingly, for a given rotation of the shaft, the rate and direction of the linear movement of the transmission mechanism may be selectively varied. To this end an actuating arm 150 projecting from the housing 124 is provided which may be adjusted by an operator to selectively position the control bearing 127 at an angle relative to the shaft (see FIGS. 16 and 18), the position of the arm determining a helically directed or circularly directed path of contact on the shaft by the rolling elements 130. In the present instance a notched bracket 152 is mounted on one end of the carrier plate 138, the arm 150 adapted to engage in selected notches of the bracket to fix the angular position of the control bearing 127 relative to the shaft 122 for a given setting of the arm 150 (see FIG. 17). If desired other means may be provided for setting the position of arm 150 to allow for more settings than the three settings of bracket 152.

The rotational input of the shaft 122 is converted to linear output as reflected in the motion of the carrier 138 axially along the shaft 122, the angular position of the control bearing 127 relative to the axis of the shaft 122 determining the rate of movement relative to the shaft for a given rotation thereof. When the control bearing 127 is angularly disposed relative to the axis of shaft 122, the rolling elements 130 defining a helix on the shaft much in the nature of the pitch or lead of a conventional screw thread. In other words, as the shaft 122 rotates in a given direction, the balls 130 describe a helical path along the shaft 122 to affect lateral movement of the carriage 138 forward or backward depending on the direction of rotation of the shaft and the angle at which the bearing assembly 127 is inclined relative to the shaft. Considering now briefly operation of the transmission mechanism, and assuming the shaft 122 is rotating in a clockwise direction with respect to FIG. 17, and the control bearing 127 is disposed angularly relative to the shaft in the direction shown in FIG. 18, the carriage 138 is translated or moved in a direction to the left as viewed in FIG. 16. For the same direction of rotation of the shaft 122, the carriage 138 may be caused to move in the opposite direction simply by reversing the angular position of the control bearing assembly 127 by means of the adjusting arm 150. As noted previously, the balls 130 of the control bearing assembly are in direct contact with the shaft 122 and thus the rolling elements rotate about an axis which develops as a result of the contact between the two. In this manner, galling, smearing and other surface distresses developing as a result of the contact are minimize The carrier 138 may be connected in various ways to an external mechanism to affect selected linear motion of the external mechanism such as a table relative to the shaft 122 which may be suitably rotated by actuating means such as a motor. In the present instance, the rate and direction of movement of the carrier 138 and any external mechanism connected to the carrier may be selectively varied in the manner described above. Additionally, by selectively adjusting the compression of spring 142 through adjusting bolt 146, the thrust capability of the system may also be varied.

I claim:

1. A system including a transmission mechanism mounted on a rotatable shaft and adapted for movement axially of the shaft upon rotation thereof comprising a housing, at least one control ball bearing assembly mounted in said housing including an outer raceway and a plurality of ball elements therein confronting and circumscribing the shaft and in direct contact therewith, means for selectively varying the relative angular relationship of said control bearing assembly and said shaft whereby when said control bearing assembly is disposed at an angle to the axis of said shaft, axial movement of said transmission mechanism is effected relative to the shaft, the balls rotating about orbiting axes through their own centers, the direction of which is determined by the rolling contact thereof with said shaft and raceway.

2. A system as claimed in claim 1 wherein said housing includes a pair of axially spaced collar members rotatably mounted on said shaft, a generally cylindrical tubular member circumscribing the collars and fixedly secured to one of said collars, means for adjusting the other collar circumferentially of said tubular housing, and resilient elastically yieldable mounting means engagable with said collars and said control bearing assembly whereby the angular position of said control bearing assembly relative to the shaft may be selectively varied by rotating said other collar member relative to said tubular housing.

3. A system as claimed in claim 2 wherein said mounting means comprises an elongated rod which straddles said control bearing assembly having its outer terminal ends engaged in socket-like openings in said collars, a pair of discs on either side of said bearing assembly and a compression spring circumscribing the rod between each disc and the inner wall of the collar.

4. A system as claimed in claim 1 wherein said housing comprises a generally tubular member circumscribing the shaft, a pair of collars journalled on the shaft and secured to said tubular member adjacent opposite ends thereof.

5. A system as claimed in claim 4 wherein the means for varying the angular relationship includes control bearing assemblies biased to an angularly disposed position relative to the shaft and to one another by means of a series of compression springs.

6. A system as claimed in claim 4 wherein the means for varying the angular relationship includes means for selectively displacing the bearing assembly in a predetermined manner to vary the relative contact zones between the rolling elements and the shaft thereby to selectively vary the rate and direction of movement of said transmission mechanism relative to the shaft for a given direction of rotation of the shaft.

7. A system including a transmission mechanism mounted on a rotating shaft and adapted for movement axially of the shaft upon rotation thereof comprising a housing, at least one control bearing assembly mounted in said housing including an outer raceway and a plurality of ball elements therein circumscribing the shaft and in direct contact therewith, means for selectively varying the relative angular relationship of said control bearing assembly and said shaft whereby when said control bearing assembly is disposed at an angle to the axis of said shaft, the rolling elements describe a helical path on said shaft and effect axial movement of said transmission mechanism relative to the shaft, the balls rotating about orbiting axes through their own center, the direction of which is determined by the rolling contact therewith with said shaft and raceway, support means engaged with a pair of stationary rail members, and means for selectively varying the thrust capability of the transmission mechanism.

8. A system as claimed in claim 7, said support means including a carriage having rollers engaging said stationary rail members, said means for varying the thrust capability including a post projecting from said housing through said carriage and a compression spring circumscribing said post whereby the thrust capability of the transmission mechanism may be controlled.

9. A system as claimed in claim 8, said means for varying the angular relationship including a notched bracket mounted on said carriage and an arm connected to said housing engageable with said bracket and selectively movable between the notches in said bracket, movement in said control arm rotating said housing and operable to selectively vary the angular position of the control bearing relative to the axis of said shaft thereby to vary selectively the rate and direction of movement of said transmission mechanism relative to said shaft.

References Cited

UNITED STATES PATENTS

| 2,204,638 | 6/1940 | Weathers | 74—25 |
| 2,441,092 | 5/1948 | Weathers | 74—25 |
| 2,578,026 | 12/1951 | Taylor | 74—25 X |
| 2,940,322 | 6/1960 | Uhing | 74—25 X |
| 3,046,800 | 7/1962 | Pravel | 74—25 |

FRED C. MATTERN, JR., *Primary Examiner.*

W. S. RATLIFF, JR., *Assistant Examiner.*

U.S. Cl. X.R.

74—89, 99